United States Patent
Kuhl et al.

(10) Patent No.: US 8,332,756 B2
(45) Date of Patent: *Dec. 11, 2012

(54) SYSTEM AND METHOD FOR INSERTING A GRAPHIC OBJECT INTO A TEXT BASED MESSAGE

(75) Inventors: Lawrence Edward Kuhl, Waterloo (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 806 days.

This patent is subject to a terminal disclaimer.

(21) Appl. No.: 12/509,640

(22) Filed: Jul. 27, 2009

(65) Prior Publication Data

US 2010/0031184 A1 Feb. 4, 2010

Related U.S. Application Data

(63) Continuation of application No. 10/935,620, filed on Sep. 8, 2004, now Pat. No. 8,281,239.

(51) Int. Cl.
*G06F 3/00* (2006.01)
(52) U.S. Cl. ........ 715/705; 715/712; 715/713; 715/813; 715/812
(58) Field of Classification Search .................. 715/773, 715/705, 712–713, 812–813, 816, 853, 726, 715/765
See application file for complete search history.

(56) References Cited

U.S. PATENT DOCUMENTS

| | | | |
|---|---|---|---|
| 5,748,177 A * | 5/1998 | Baker et al. | 345/172 |
| 6,629,793 B1 | 10/2003 | Miller | |
| 2004/0018858 A1 | 1/2004 | Nelson | |
| 2005/0144237 A1* | 6/2005 | Heredia et al. | 709/206 |
| 2006/0009243 A1* | 1/2006 | Dahan et al. | 455/466 |
| 2006/0015812 A1* | 1/2006 | Cunningham et al. | 715/535 |

* cited by examiner

*Primary Examiner* — Doon Chow
*Assistant Examiner* — Linh K Pham
(74) *Attorney, Agent, or Firm* — Gowling Lafleur Henderson LLP

(57) ABSTRACT

A system and method for selecting graphic objects to insert in a text message when composed on a wireless device, each of the graphic objects representing a set of individual alphanumeric characters. The system comprises an object table for display on a user interface of the device, such that the table is configured for including a first object of the graphic objects associated with a first predefined input and a second object of the graphic objects associated with a second predefined input. The first input is different from the second input. The system also has a first input event component for coupling to the user interface such that the first input event component is configured for mapping to the first predefined input. The system also has a second input event component for coupling to the user interface such that the second input event component is configured for mapping to the second predefined input, the first input event component being different from the second input event component. A user of the device selects one of the graphic objects from the table by employing the respective one of the input event components mapped to the predefined input associated with the graphic object in the table.

16 Claims, 10 Drawing Sheets

SYSTEM AND METHOD FOR INSERTING A GRAPHIC OBJECT INTO A TEXT BASED MESSAGE

CROSS-REFERENCE TO RELATED APPLICATIONS

This application is a continuation of application Ser. No. 10/935,620, filed on Sep. 8, 2004, now U.S. Pat. No. 8,281,239, the entire disclosure of which is hereby incorporated by reference for all purposes.

BACKGROUND

With the increasing popularity of instant messaging, as well as email, users continue to develop shortcuts for conveying words, phrases, and emotions to make these text-based communications more efficient and fluent. These shortcuts may include the insertion of acronyms, abbreviations, symbols, or combinations thereof in to the text messages. Given the difficulty in communicating emotion with written communications, a growing set of accepted symbols for emotions often punctuates these text-based messages. For example, a :-) or :-( can easily convey whether a sender of a message is happy or sad, respectively.

However, reduced sizes and varying complexities of keyboards for mobile communication devices typically involves the use of additional symbol tables and other data input means that are different from standard QUERTY keyboards for desktop environments. These keyboard differences as well as the effects of miniaturization can make the required input sequence for emoticons time consuming and inconvenient for a majority of the emoticons used in commonly used text messaging applications.

Accordingly, it is an object of the present invention to provide a graphic object insertion system and method to obviate or mitigate at least some of the above presented disadvantages.

SUMMARY OF THE INVENTION

Reduced sizes and varying complexities of keyboards for mobile communication devices typically involves the use of additional symbol tables and other data input means that are different from standard QUERTY keyboards for desktop environments. These keyboard differences as well as the effects of miniaturization can make the required input sequence for emoticons time consuming and inconvenient for a majority of the emoticons used in commonly used text messaging applications. Contrary to present graphic object insertion methods, there is provided herein a system and method for selecting graphic objects to insert in a text message when composed on a wireless device, each of the graphic objects representing a set of individual alphanumeric characters. The system comprises an object table for display on a user interface of the device, such that the table is configured for including a first object of the graphic objects associated with a first predefined input and a second object of the graphic objects associated with a second predefined input. The first input is different from the second input. The system also has a first input event component for coupling to the user interface such that the first input event component is configured for mapping to the first predefined input. The system also has a second input event component for coupling to the user interface such that the second input event component is configured for mapping to the second predefined input, the first input event component being different from the second input event component. A user of the device selects one of the graphic objects from the table by employing the respective one of the input event components mapped to the predefined input associated with the graphic object in the table.

There is provided herein a system for selecting graphic objects to insert in a text message when composed on a wireless device, each of the graphic objects representing a set of individual alphanumeric characters, the system comprising: a object table for display on a user interface of the device, the table configured for including a first object of the graphic objects associated with a first predefined input and a second object of the graphic objects associated with a second predefined input, the first input different from the second input; a first input event component for coupling to the user interface, the first input event component configured for mapping to the first predefined input; and a second input event component for coupling to the user interface, the second input event component configured for mapping to the second predefined input, the first input event component different from the second input event component; wherein a user of the device selects one of the graphic objects from the table by employing the respective one of the input event components mapped to the predefined input associated with the graphic object in the table.

Also disclosed there is provided a method for selecting graphic objects to insert in a text message when composed on a wireless device, each of the graphic objects representing a set of individual alphanumeric characters, the method comprising the steps of: displaying an object table on a user interface of the device, the table configured for including a first object of the graphic objects associated with a first predefined input and a second object of the graphic objects associated with a second predefined input, the first input different from the second input; employing one of a first input event and a second input event for selecting the desired graphic object from the first and second objects, the first input event configured for mapping to the first predefined input and the second input event configured for mapping to the second predefined input, the first input event different from the second input event; and inserting the selected graphic object in to the text message.

Also disclosed there is provided a computer program product for selecting graphic objects to insert in a text message when composed on a wireless device, each of the graphic objects representing a set of individual alphanumeric characters, the computer program product comprising: a computer readable medium; a object table module stored on the medium for display on a user interface of the device, the table module configured for including a first object of the graphic objects associated with a first predefined input and a second object of the graphic objects associated with a second predefined input, the first input different from the second input; a first input event module stored on the medium for coupling to the user interface, the first input event module configured for mapping to the first predefined input; and a second input event module stored on the medium for coupling to the user interface, the second input event module configured for mapping to the second predefined input, the first input event module different from the second input event module; wherein a user of the device selects one of the graphic objects from the table by employing the respective one of the input event modules mapped to the predefined input associated with the graphic object in the table.

BRIEF DESCRIPTION OF THE DRAWINGS

These and other features will become more apparent in the following detailed description in which reference is made to the appended drawings wherein.

DESCRIPTION

Network System

Figure 1:
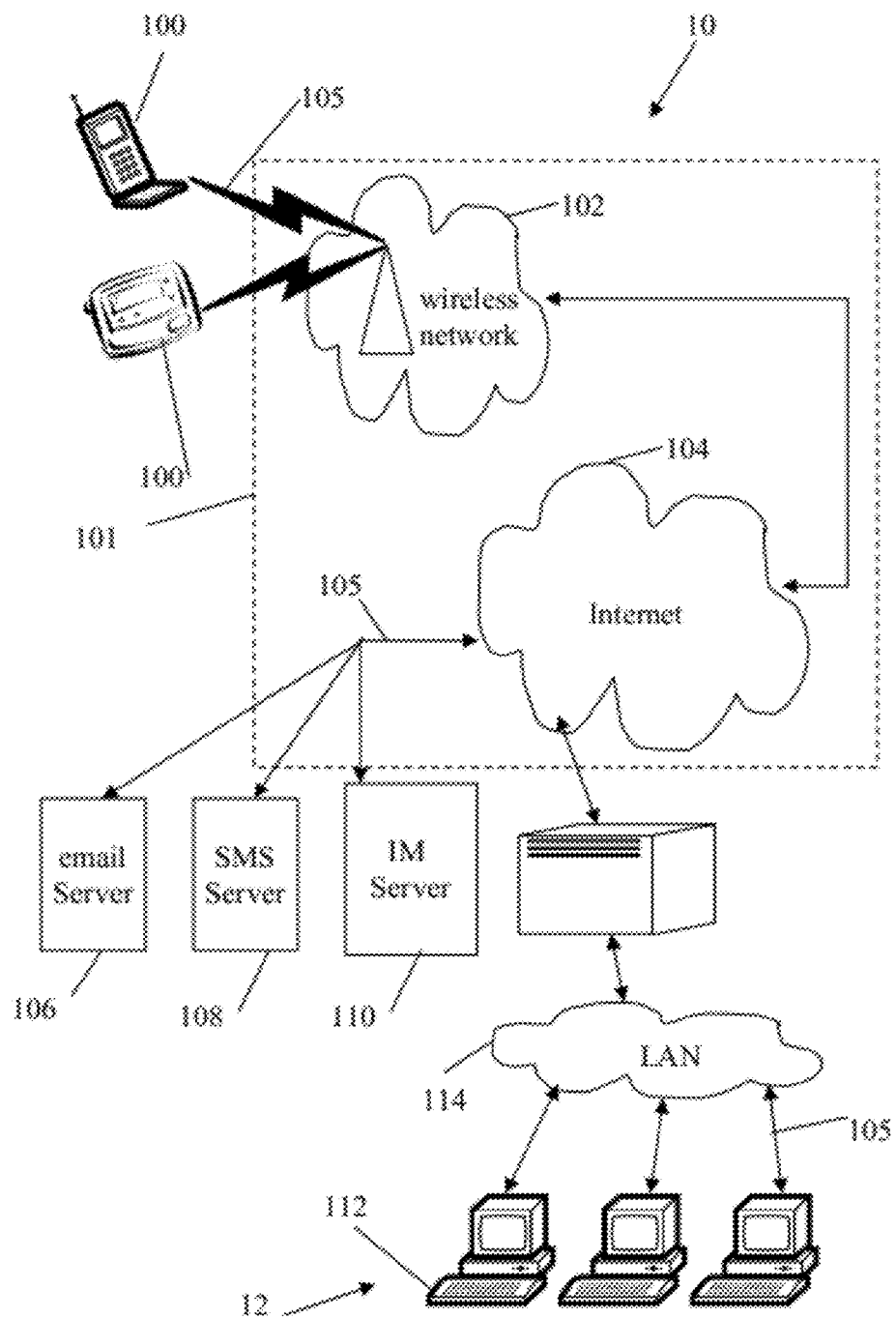
FIG. 1 is a block diagram of a network messaging system.

Referring to FIG. 1, a communication network 10 comprises mobile communication devices 100 for interacting with one another via a network 101, which can contain a wireless network 102 and the Internet 104. The wireless network 102 supports the transmission of data in network messages 105 between the devices 100 and external systems 12, which are coupled to the wireless network 102. The wireless network 102 may also support voice communication for telephone calls between the mobile communication devices 100 and devices which are external to the wireless network 102. A wireless data transmission protocol can be used by the wireless network 102, such as but not limited to DataTAC, GPRS or CDMA. The mobile devices 100 transmit and receive the messages 105, such as text and/or voice based messages 105, when in communication with one another via a server. For text based messages 105, the server can be such as but not limited to an email server 106, a Short Message Service (SMS) server 108, or an Instant Messaging (IM) server 110. It is recognized that the external systems 12 can include desktop computers (i.e. wired devices) 112 coupled to the network 101 via a LAN 114.

The mobile devices 100 can communicate with one another as clients of the servers 106, 108, 110 using the messages 105 in the form of message header information and associated data content, for example when exchanging personal messages 105. The format of the personal messages 105 communicated between the devices 100 is moderated by a mutual contract (as is known in the art) embodied in the application programs 302 (see FIG. 2), which are executed on the devices 100. The mutual contract facilitates standardized communication between the devices 100 of Emoticons and other graphics based objects/icons included in the data content of the messages 105. It is recognized that the mobile devices 100 can communicate with one or more servers 106, 108, 110 via the wireless network 101. It is also recognized that the functionality of the servers 106,108,110 could be as shown or combined in to one or more generic servers coupled to the network 101, if desired.

Client Device

Figure 2:
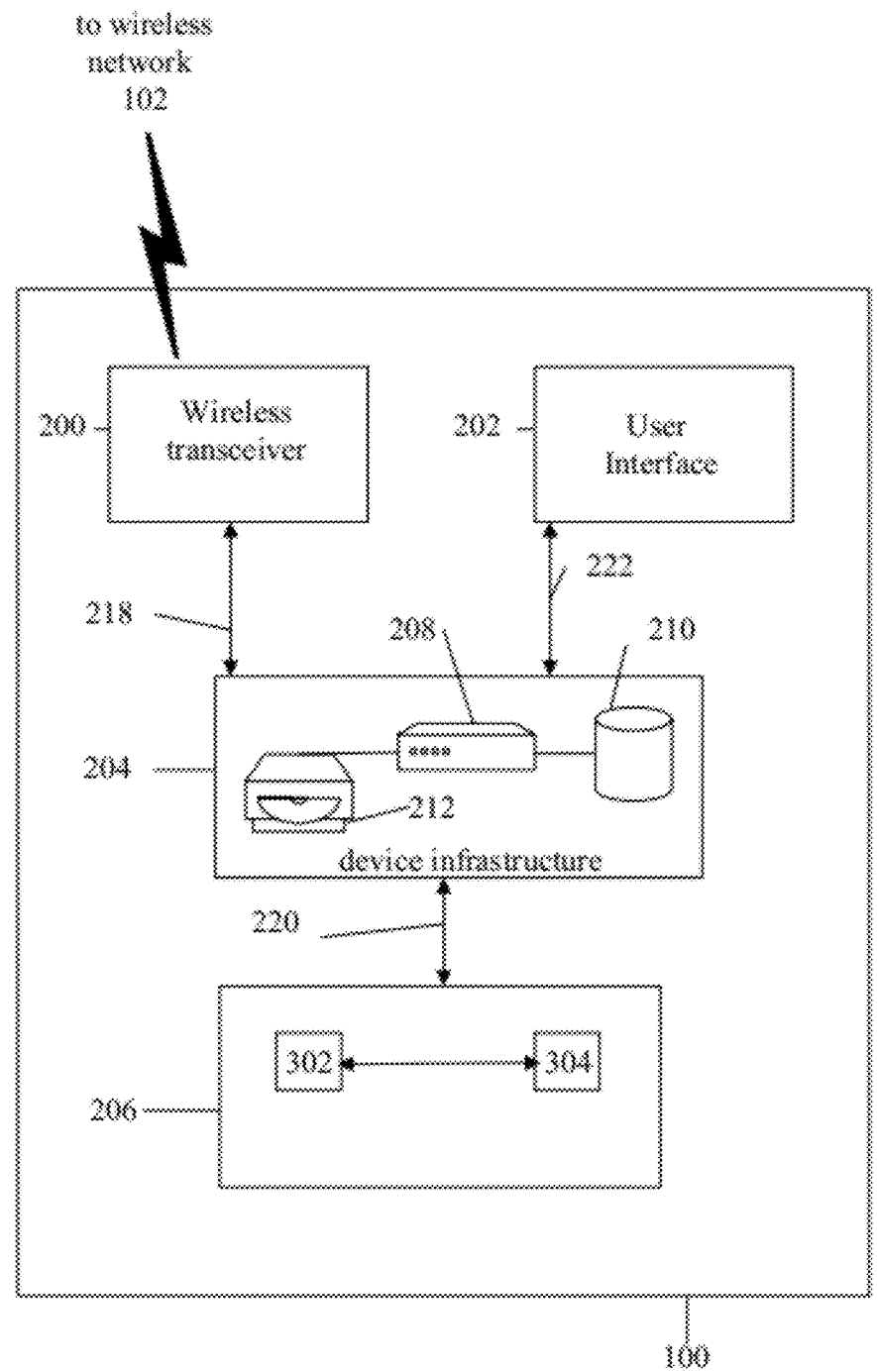
FIG. 2 is a block diagram of a mobile communication device of FIG. 1.
Figure 9:
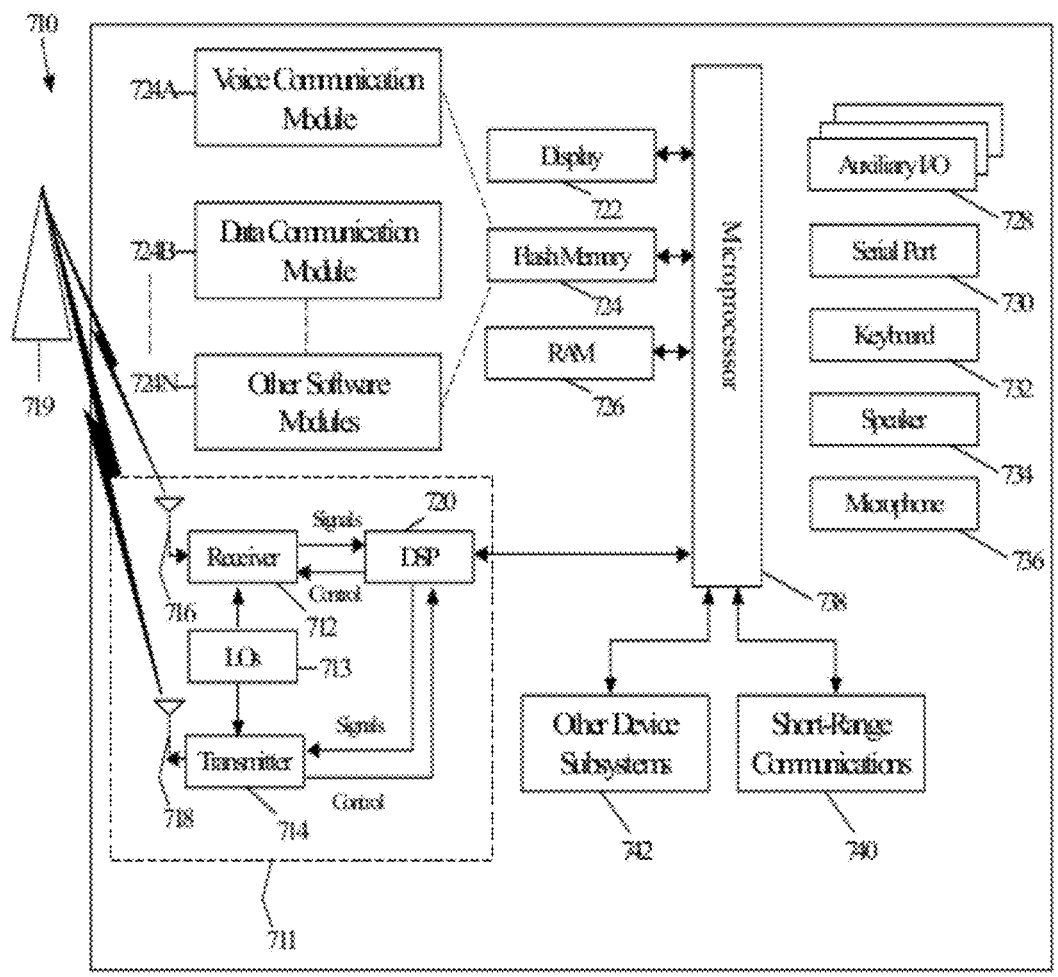
FIG. 9 is a block diagram of a further example of the mobile communication device of FIG. 2.

Referring to FIG. 2, the mobile communication devices 100 are devices such as but not limited to mobile telephones, PDAs, two-way pagers and dual-mode communication devices 710 (see FIG. 9). The mobile devices 100 include a wireless transceiver 200 coupled via connection 218 to a device infrastructure 204. The wireless transceiver 200 is connectable during operation of the mobile devices 100 to the wireless network 102 by a suitable wireless channel such as RF or IR links, which enables the mobile devices 100 to communicate with each other and with external systems (such as the servers 106,108,110) via the network 101, and to coordinate the messages 105 between the client application programs 302 via the servers 106, 108, 110 (see FIG. 1).

Referring again to FIG. 2, the mobile devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, and a user output device such as an LCD screen display. If the screen is touch sensitive, then the display can also be used as the user input device as controlled by the device infrastructure 204. The user interface 202 is employed by the user of the mobile device 100 to coordinate the exchange of messages 105 over the network 10 (see FIG. 1) as employed by client application programs 302.

Referring again to FIG. 2, operation of the mobile communication device 100 is enabled by the device infrastructure 204. The device infrastructure 204 includes a computer processor 208 and associated memory module 210. The computer processor 208 manipulates the operation of the wireless transceiver 200, the user interface 202 and a runtime environment 206 of the mobile communication device 100 by executing related instructions, which are provided by an operating system and client application programs 302 provisioned in the runtime environment 206. Further, it is recognized that the device infrastructure 204 can include a computer readable storage medium 212 coupled to the processor 208 for providing instructions to the processor 208 and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the runtime environment 206 of the mobile device 100 is coupled to the device infrastructure 204 by connection 220. The runtime environment 206 provides a native runtime environment for the client application programs 302 and is an interface to the mobile device 100 functionality of the processor 208 and associated operating system of the device infrastructure 204. The runtime environment 206 preferably supplies a controlled, secure and stable environment on the mobile device 100, in which the component application programs 302 are provisioned and executed. The runtime environment 206 and/or the application programs 302 also provide services 304 (such as but not limited to Communications, Screen, Data Persistence, and Security). The client runtime environment 206 is preferably capable of generating, hosting and executing the client application programs 302. Further, specific functions of the runtime environment 206 can include support for language, coordinating memory allocation, networking, management of data during I/O operations, coordinating graphics on the output device of the user interface 202 via the device infrastructure 204 and providing access to core object oriented classes and supporting files/libraries. Examples of the runtime environments 206 can include such as but not limited to Common Language Runtime (CLR) by Microsoft and Java Runtime Environment (JRE) by Sun Microsystems. The runtime environment 206 supports basic functions for the client application programs 302 on the mobile device 100, such as but not limited to:

provide a communications service 304 capability to send the messages 105 over the network 101 (see FIG. 1); provide data input service 304 capabilities by the user on the input device to supply data content for outgoing messages 105 (see FIG. 1); provide data presentation or output service 304 capabilities for incoming messages 105; and provide data storage services 304 to maintain local client data in the memory module 210.

In general, the services 304 coordinate communications via the connection 220 with the device infrastructure 204. For example, the communication service 304 manages connectivity between the component application programs 302 and the network 101. Messages 105 are sent to the appropriate server 106,108,110 by the communication service 304 on behalf of the component applications 302. The communication service 304 also receives data of the messages 105 from the server 106,108,110 and delivers the data to the component applications 302. Data received by the communication service 304 can include synchronous responses to requests made by the component application programs 302 and asynchronous data pushed to the mobile communication device 100 by the server 106,108,110. The communication service 304 also manages connectivity when the mobile communication device 100 is disconnected from the network 101. When the mobile communication device 100 is in disconnected mode, messages sent by the component applications 302 can be queued by the communication service 304, and sent once the mobile communication device 100 is reconnected to the network 102.

Referring again to FIG. 2, the screen service 304 manages the visual representation of the component application programs 302 as they are displayed on the output device of the user interface 202. The visual representation can include images such as Emoticons and other graphics based objects/icons 402 (see FIG. 4), graphical user interface (GUI) controls and windows, and text. The screen service 304 can manage a screen stack, which controls what the user sees on the output device of the device infrastructure 204. Further, the persistence service 304 allows the component application programs 302 to store data in the memory module 210 of the device infrastructure 204. Database operations can be provided by the persistence service 304 in a transparent fashion to the component application programs 302.

Communication Servers

Referring again to FIG. 1, the IM server 110 enables short text messages 105 to be exchanged between the devices 100, whereby a user of the device 100 uses the user interface 202 for inputting the message 105 using (for example) keys 306 of a keypad 300 (see FIG. 3), such that the composed message 105 is exchanged over the network 101 via the IM server 110. The keypad 300 (or other input event component means) and the display 308 (of the user interface 202) enable the user to, respectively, input the message 105 or associated command data and display the inputted or received message 105 or associated command data. The user may enter text via the user interface 202 by holding the device 100 in two hands and performing a "thumb typing;" or other two-finger "poke typing" technique on the keypad 300.

The IM server 108 allows users of the devices 100 to form a list of people with whom they wish to communicate. This list is typically called a "buddy list," and the IM server 110 facilitates users to communicate with anyone on their buddy list, assuming that the person is on-line at that given time. Generally, users of the device 100 will send an alert to those persons on their buddy list who are on-line (connected via the network 101) prior to engaging in a conversation via the messages 105. IM server 110 services provide a small text window on the display 308 (see FIG. 3) of the device 100, where two or more users can type messages that both users can instantly view on the displays 308 of their respective devices 100. IM messages 105 are typically short, abbreviated strings of text capable of conveying a certain meaning, and preferably associated with characteristics of the sender of the message 105. These characteristics relate to the emotional state or personality of the sender, as well as any particular emphasis associated with a given message. Thus, an aspect of IM is the ability to effectively communicate these characteristics via graphics based objects/icons such as Emoticons. Examples of IM servers 110 include such as but not limited to Microsoft Messenger, AOL Instant Messenger, Yahoo Messenger and ICQ.

Referring again to FIG. 1, the SMS server 108 also enables short text messages 105 to be exchanged between the devices 100, whereby a user of the device 100 inputs the message 105 using keys 306 of the keypad 300 (see FIG. 3) for transmission over the network 101 via the SMS server 108. Similar to IM messages 105, SMS messages 105 are also typically short, abbreviated strings of text capable of conveying a certain meaning, and preferably associated with characteristics of the sender of the message 105. The SMS server 108 and associated application programs 302 on the devices 100 can accommodate the use of Emoticons and other graphics based objects/icons 402 (see FIG. 4) as well as abbreviations, as further described below. It is recognized that email usage between the devices 100 via the email server 106 also increasingly employs Emoticons, abbreviations, and other graphics based objects/icons as data content for the email messages 105.

Message Content

The increasing usage of text messaging (such as but not limited to IM, SMS and email) has led to a greater popularity in Emoticon use. Emoticons are pictures built out of for example ASCII characters, often sideways, used in human-to-human electronic communications, such as e-mail, chat, and IRC. The use of emoticons is intended to compensate for the lack of evocative, emotional content in the text of the messages 105. Abbreviations are another form of alphanumeric character sequences expressed as a graphic object in text messages 105, and are used as a keystroke saving measure by the users of the devices 100. Device users commonly insert emoticons and other graphics based objects/icons 402 (alphanumeric based) in their messages 105 (via the keyboard 300—see FIG. 3) as a sequence of typed characters that creates a rough picture of something, such as a facial expression. For example the typed sequence ":", "-", ")" is such that the colon represents the eyes, the dash represents the nose, and the right parenthesis represents the mouth, hence :-). More commonly known as "smileys" and also referred to as "ASCII-grams," emoticons number in the hundreds and are used to indicate emotions such as delight, sadness, or frustration. The most popular emoticon is the above noted smiling face, which people use in e-mail or chat rooms to say, "If you could see me now, I'd be smiling." It is recognized that representation of the alphanumeric character sequences on the display 308 (see FIG. 3) of the device 100 can be that of the raw alphanumeric character sequence or as a graphical icon representing the character sequence. For convenience, Emoticons and other alphanumeric based character sets (including abbreviations) will hereafter be referred to as alphanumeric based graphic objects 402, which represent a set or group of alphanumeric characters that are in a predefined order.

Figure 6:
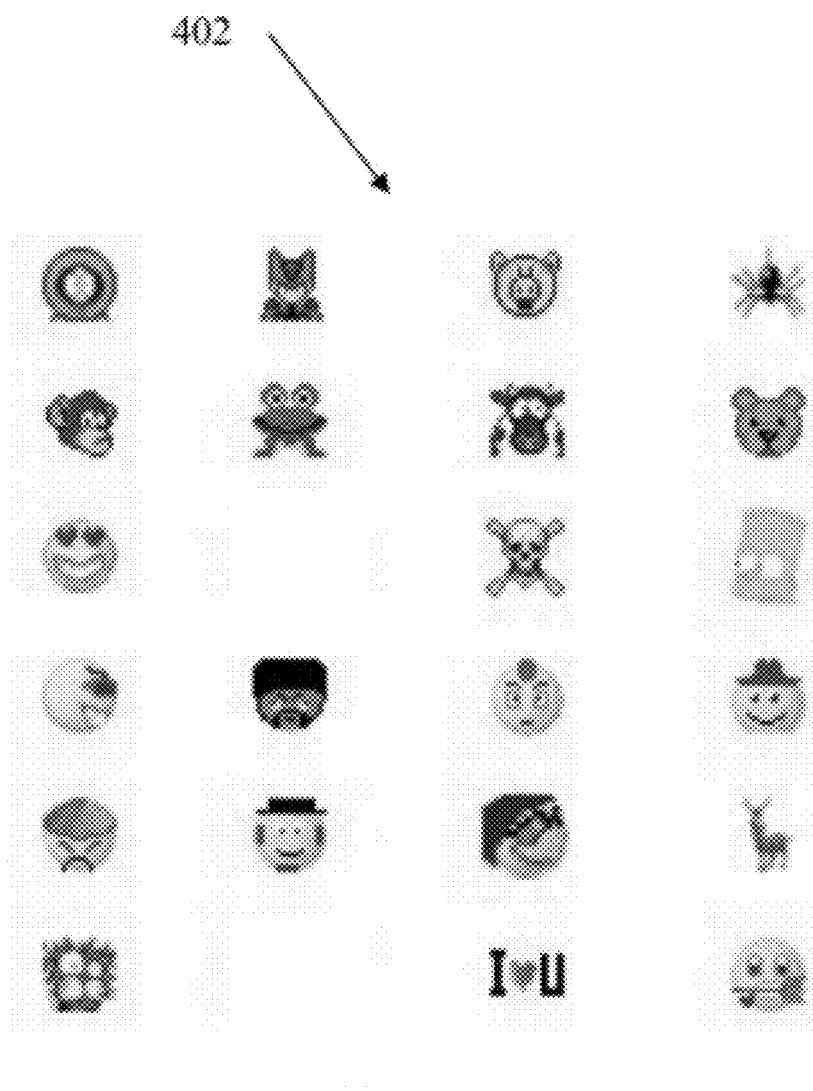
FIG. 6 shows further example emoticons of the table of FIG. 4.

The term "emoticon" can be defined as "an icon that represents emotion." Emoticons are one type of graphical objects 402 that grew out of the need to display feeling in the twodimensional, online, written world of messages 105. When speaking face-to-face (F2F), a person's facial expressions help you understand the meaning of what he or she is saying. Emoticons are an attempt to bring that extra nuance to online communications of the devices 100 by composing a face out of alphanumeric characters. Some emoticons don't require you to tilt your head to see them. There's a new group of ASCII icons called assicons, as well as another group, called straight-on smileys. There are also elaborate images, known as ASCII art. These are generally used in sig files. Emoticons usually follow after the punctuation (or replace the punctuation) at the end of a sentence. An emoticon tells someone what you really mean when you make an offhand remark ;^) Examples of graphical objects 402 as emoticons are:

:-)—Happy
:-(—Sad
:-o—Surprised
:-@—Screaming
:-I—Indifferent
:-e—Disappointed
>:-<—Mad
:-D—Laughing
;-)—Wink It is recognized that emoticons can be broadly defined to include other alphanumeric character sequences including abbreviations as graphical objects 402, such as:

<BFN> Bye For Now
<BTW> By The Way
<G> Grin
<HTH> Hope This Helps
<IJWTK> I Just Want To Know
<IJWTS> I Just Want To Say
<IMHO> In My Humble Opinion
<LOL> Laughing Out Loud
<OTOH> On The Other Hand
<ROTFL> Rolling on the Floor Laughing
<TOY> Thinking of You
<YMMV> Your Mileage May Vary as well as other non-emotional alphanumeric based objects 402 (e.g. flower (F), cat (@) and gift (G)). Examples of equivalent graphical objects 402 (e.g. icons) of corresponding alphanumeric based character sequences are shown in FIG. 6.

It is recognized that the alphanumeric character sets can be based on such as but not limited to ASCII characters and Unicode characters. Unicode characters are a set of codes used to represent letters, numbers, control characters, and the like, designed for use internationally in computers. Adopted as an international standard in 1992, it is intended to replace ASCII as the primary alphanumeric character set. Unicode is a "double-byte," or 16-digit, binary number (see numeration) code that can represent up to 65,536 items. The Unicode standard defines codes for letters, special characters, and other linguistic symbols used in every major language written today. It includes the Latin alphabet used for English, the Cyrillic alphabet used for Russian, the Greek, Hebrew, and Arabic alphabets, and other alphabets and alphabet like writing systems used in countries across Europe, Africa, the Indian subcontinent, and Asia, such as Japanese kana, Korean hangeul, and Chinese bopomofo. The largest part of the Unicode standard is devoted to thousands of unified character codes for Chinese, Japanese, and Korean ideographs.

Graphical Object Input and Transmission

Figure 7:
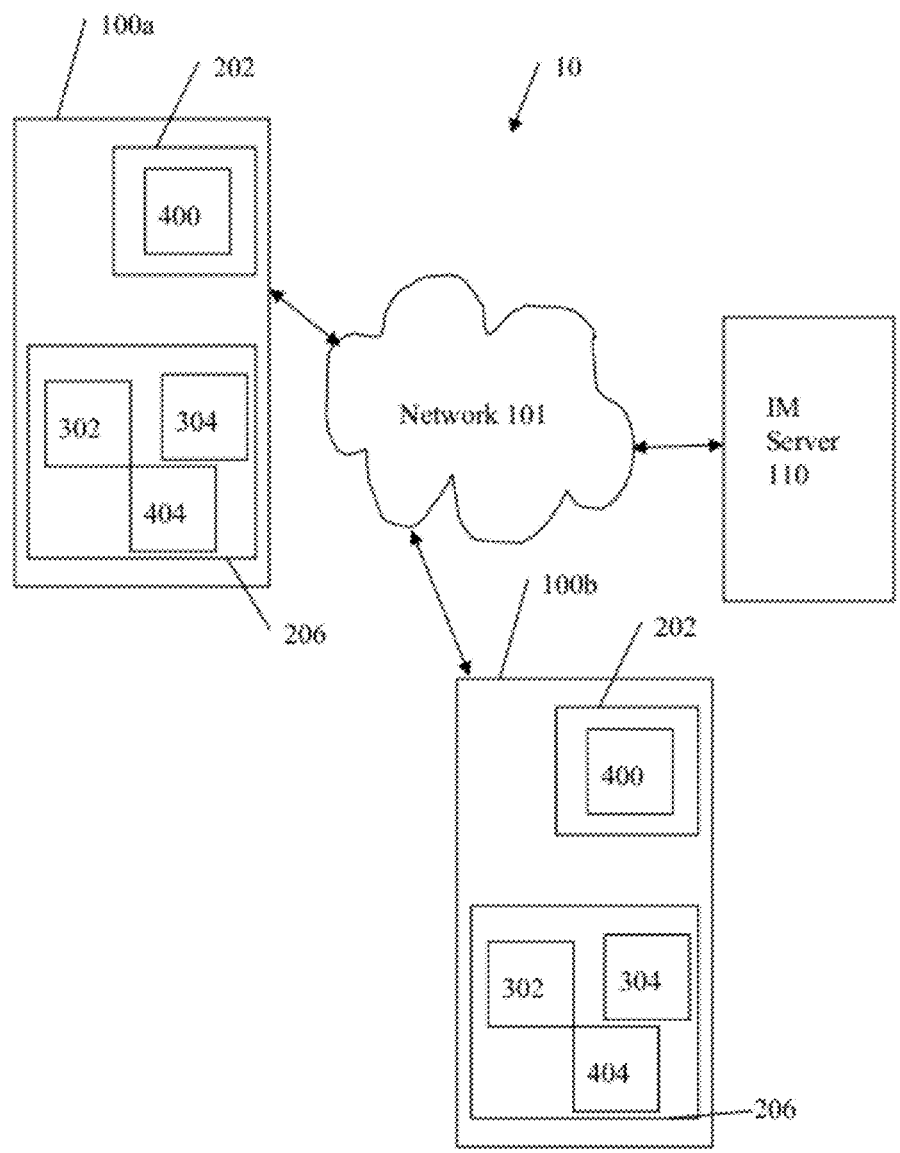
FIG. 7 diagram of an example messaging environment of the system of FIG. 1.

Nowadays, the emoticons and other alphanumeric based character sets are typically displayed on the user interface 202 (see FIG. 2) as graphical icons/objects 402 in graphics enabled UI environments. Referring to FIG. 7, an example network 10 is shown for an IM message environment by way of example only, wherein an IM sender device 100a transmits IM messages 105 to an IM recipient device 100b via the network 101 and associated IM server 110. Based on the standardized format of the mutual contract, each application 302 of the devices 100a,b has access to a similar symbol table 410 (see FIG. 4) containing a plurality of Emoticons and other alphanumeric based graphical objects 402 and their associated predefined inputs 403, as provided. Each of the objects 402 in the table 410 is associated or otherwise mapped to the predefined input 403 also illustrated in the table 410, which is mapped to such as but not limited to specific predefined keys 306 of the keypad 300, as shown on the display 308 (see FIG. 3). It is also recognized that the predefined input 403 could be a label (e.g. "smile") that could be used for voice activated command inputs to the UI 202. It is recognized that representations of the plurality of objects 402 are not printed next to the keys 306 of the physical keypad 300, rather are only displayed on the display 308 in association with the inputs 403 provided in the displayed symbol table 410. Hence a representation (predefined input 514) of the "Y" key 314 (i.e. user input event component) is displayed in the symbol table 410 in association with a corresponding smile object 414, see FIG. 4.

The runtime environment 206 can also have an object translation module 404, which coordinates a translation between the representative alphanumeric character set and the corresponding graphical object 402 where required. For example, the messages 105 when transmitted over the network 101 typically contain data content such that the objects 402 are represented in the transmitted data stream as alphanumeric characters. Depending upon the UI 202 capabilities of the devices 100a,b, the objects 402 can be inputted and/or displayed as the series of individual alphanumeric characters or as the corresponding graphic object 402 selected from the symbol table 410 (see FIG. 4). The module 404 of the sender device 100a converts any objects 402 in the composed message 105 to the corresponding set of individual alphanumeric characters prior to transmission of the composed message 105. In turn, the module 404 of the recipient device 100b converts the individual alphanumeric characters into the appropriate graphical object 402 for display on the user interface 202.

It is recognized that the services 304 are involved in composing, transmitting/receiving and displaying the objects 402 of the messages 105. For example, the messages 105 with contained objects 402 are sent/received with respect to the appropriate server 106,108,110 by the communication service 304 on behalf of the component applications 302. The screen service 304 manages the visual representation of the messages 105 and contained objects 402 as they are displayed on the output device of the user interface 202. Further, the persistence service 304 allows the component application programs 302 to access the objects 402 of the symbol table 410, in response to input events by the user on the user interface 202, from the memory module 210 of the device infrastructure 204. It is recognized that the services 304 could be part of the application 302 or separate, as desired. As well, the module 404 could be separate from the application 302, included in the application, and/or associated with the services 304 according to the capabilities of the runtime 206 and design of the applications 302.

Figure 3:
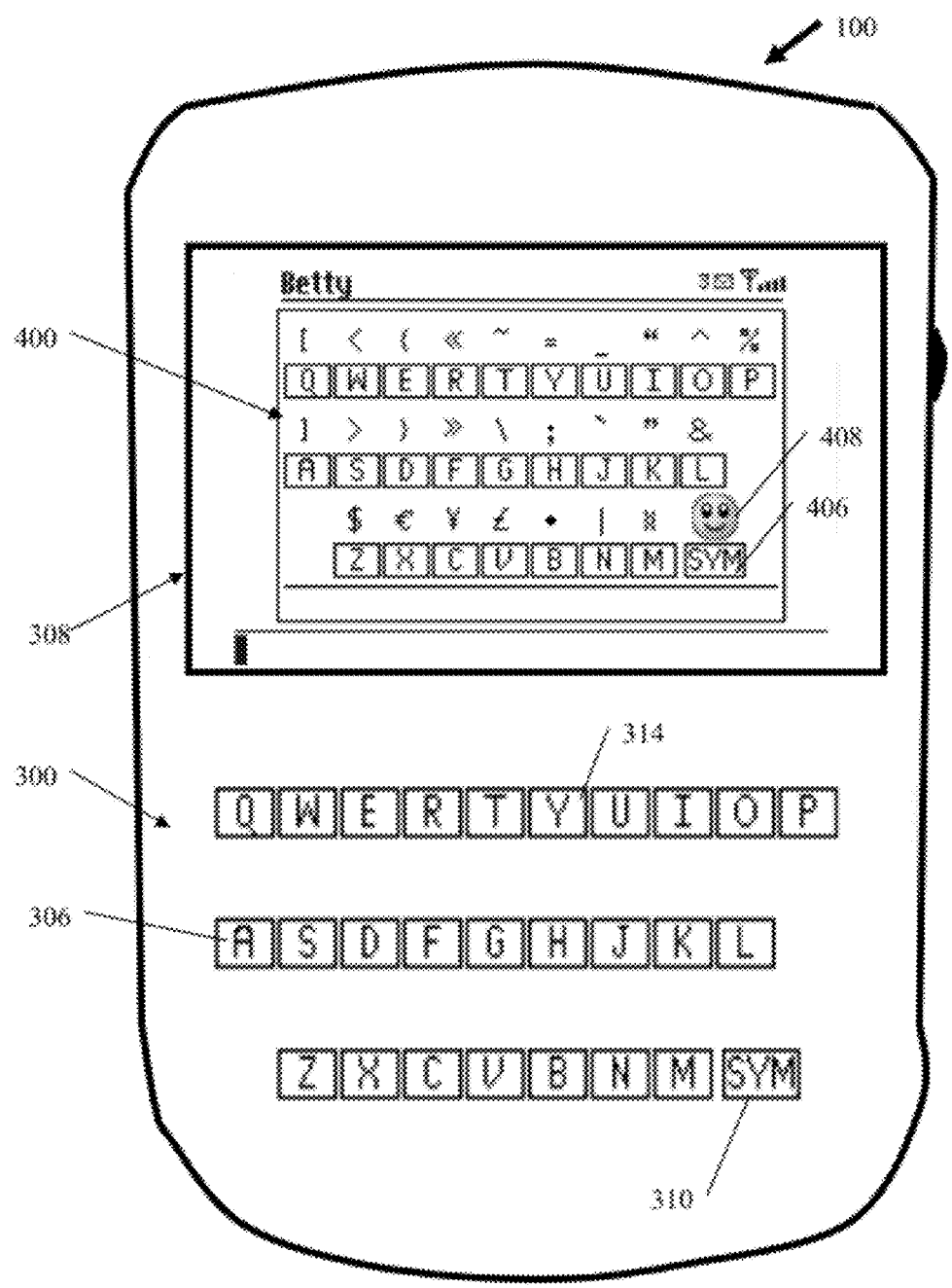
FIG. 3 is an example user interface of the device of FIG. 2.
Figure 4:
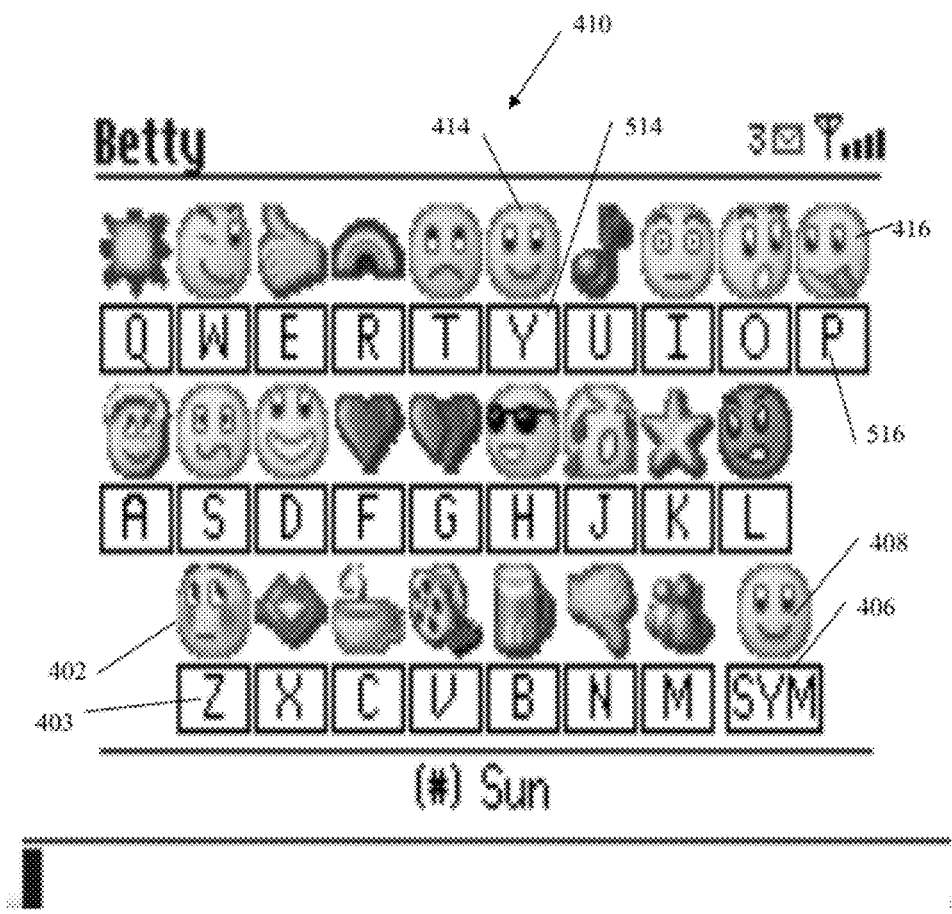
FIG. 4 is an object table for display on the user interface of FIG. 3.

Referring to FIG. 3, a symbol key 310 (or other input event component of the UI 202) when activated by the user causes the screen service 304 (see FIG. 2) to display an initial symbol table 400 on the display 308 containing individual alphanumeric characters not available as selections on the physical keypad 300. It is recognized that the key 310 or other input event (such as but not limited to voice activation and a touch sensitive display) can be used from the UI 202 (see FIG. 2) to cause the table 400 to be displayed on the display 308. Displayed in the symbol table 400 is a table selection 406 mapped to the appropriate input event of the UI 202, for example the symbol key 310 of the keypad 300. The selection 406 has an associated indicator 408 for indicating that the selection 406 is associated with the plurality of graphical objects 402 (see FIG. 4) of the primary object symbol table 410. When selected by the user, the selection 406 causes the screen service 304 to replace the table 400 with the primary object symbol table 410, as is shown in FIG. 4. It is recognized that the primary object symbol table 410 can also include the selection 406 and associated indicator 408 to cause replacement of the primary table 410 with a secondary table 412 (see FIG. 5) containing further object 402 selections. It is recognized that a number of object symbol tables 410, 412 can be sequenced in this manner on the display 308, as dictated by the number of available objects 402 for selection by the user of the device 100.

Figure 5:
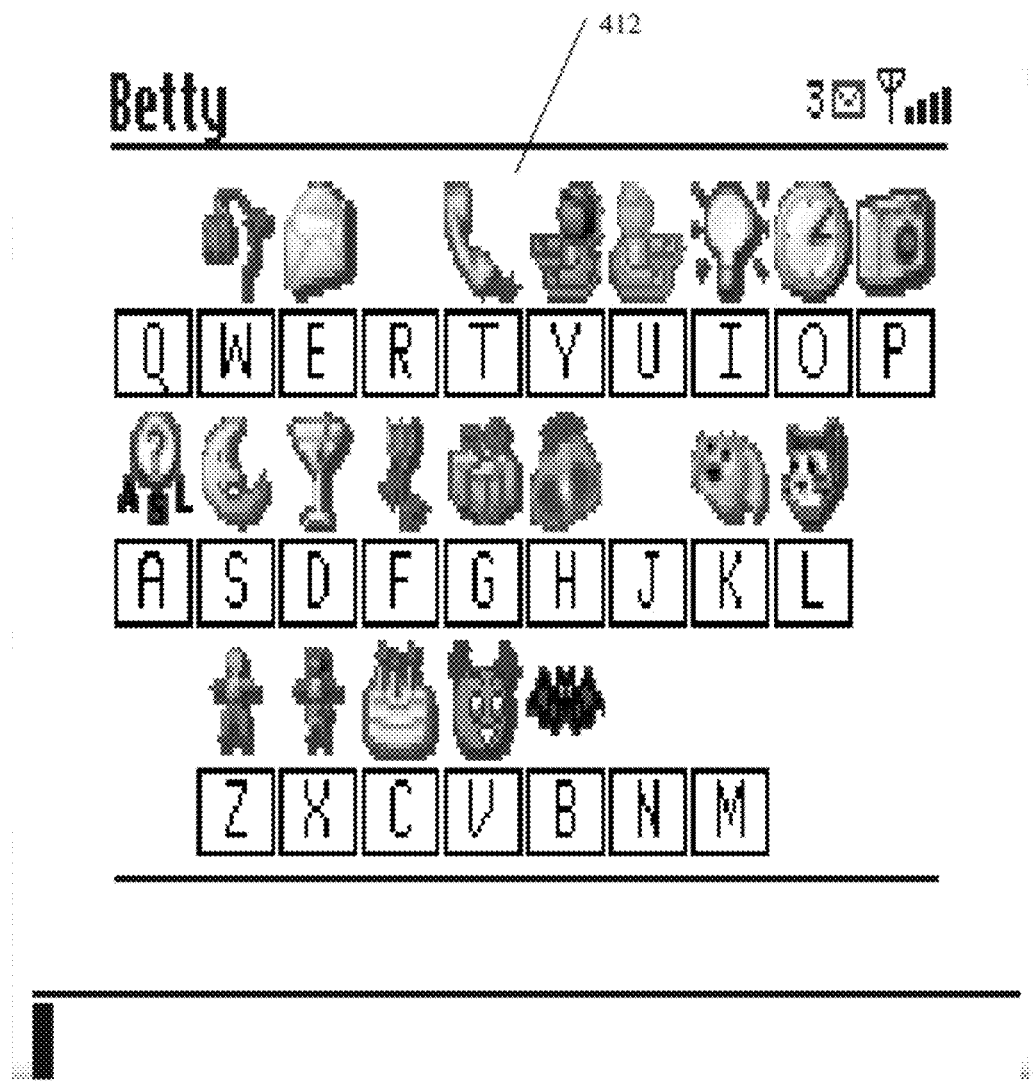
FIG. 5 is further embodiment of the object table of FIG. 4.

It is recognized that FIGS. 3, 4, 5 show the use of the same selection key 406 to access the initial table 400 as well as the additional object tables 410, 412, i.e. the "SYM" key 310. In this manner, preferably operation of the same input event (e.g. key 310) twice in relatively quick succession causes the primary table 410 (three times for the secondary table 412, etc. . . . ) to be displayed through a limited number of input events done by the user via the user interface 202, so that the user can straightforwardly display the available object 402 selections on the display 308. However, it is also recognized that the input events (e.g. keys 306 of the keypad 300) can be different for the various tables 410, 412. Accordingly, the indicator 408 can be associated with the same (or different) input events (e.g. the SYM key 310 for the table 410 and the trackwheel for the table 412) for each respective table 410, 412, as desired.

Referring to FIG. 4, once the appropriate object symbol table 410, 412 is displayed on the display 308, the user can use the predefined input 403 associated with the object 402 to choose the appropriate input event to select and then accordingly insert the selected object 402 from the table 410, 412 into the composed message 105. It is recognized that the symbol table 410, 412 as displayed on the display 308 contains each of the objects 402 (representing a sequence of individual alphanumeric characters) associated with the predefined input 403 as well as an illustration of the predefined input 403. Each of the displayed predefined inputs 403 in the table is mapped to a specified user event (e.g. key 306). For example, a "Y" key 314 (i.e. input event) is displayed as the predefined input 514 in the symbol table 410 in association with a corresponding smile object 414. For example, referring to FIGS. 3 and 4, the input events 1) push key 310 (input event) once to display the table 400, 2) push key 310 (input event) a second time to display the table 410, and 3) push the associated "Y" key 314 (input event) once as displayed in the table 410 as the predefined input 514 causes the application 302 to retrieve the specific "smile" object 414 from the memory 210 (see FIG. 2), which is subsequently input into the message 105 as composed by the user. It should be recognized that the user in the above example uses three coordinated input events to select one specific graphical object 402 (i.e. smile object 414) representing the sequence of three individual alphanumeric characters ":", "-", ")". Further, it is recognized that the object 402 could be depicted in the table 410 and also displayed on the display 308 as the sequence of alphanumeric characters, i.e. ":-)", depending upon the capabilities of the application 302 and/or device 100 and/or preference of the user. Accordingly, the use of the specified input events (e.g. key 310 with specific key 314) can facilitate the access and use from the table 410, 412 of a plurality of the objects 402 by the user in a coordinated fashion.

Figure 8:
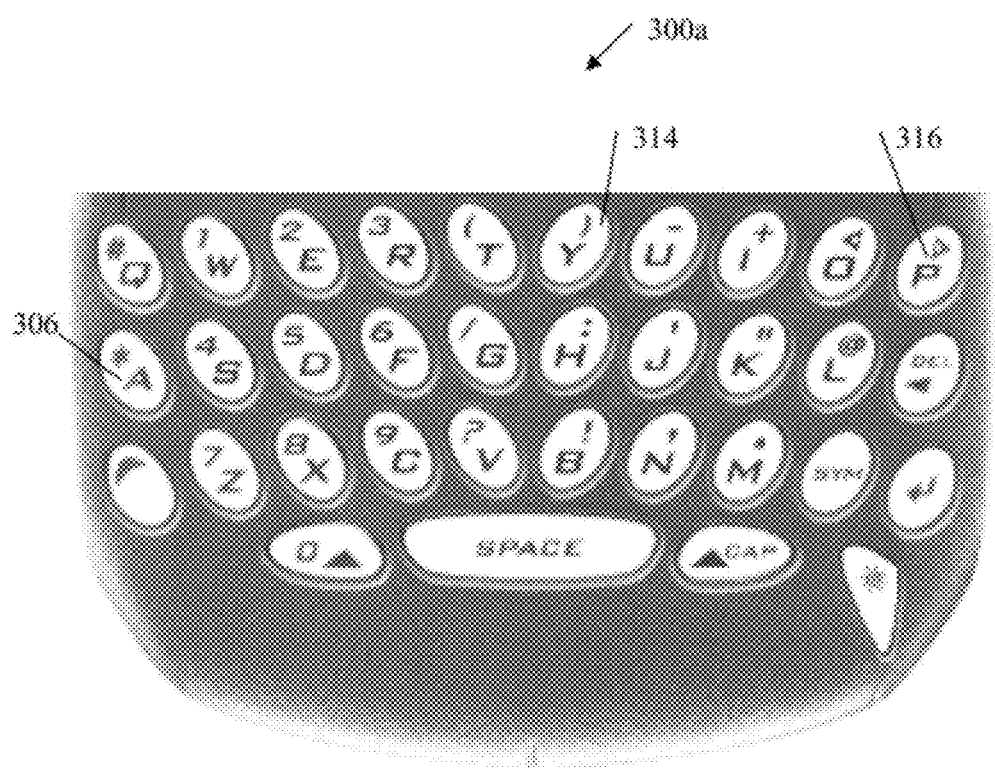
FIG. 8 is further embodiment of a keyboard of FIG. 3.

Referring to FIGS. 3 and 8, it is recognized that a keypad 300a can be configured to contain certain individual alphanumeric characters of the objects 402 (see FIG. 4) associated with the keys 306. For example, the specific "Y" key 314 has an associated ")" symbol, hence the smile object 414 (representative of :-)) is associated (via the displayed predefined input 514) with the input event key 314 such that the input event sequence: key 310—key 310—key 314 produces the object 414 on the display 308. Another example of configuring the keyboard keys 306 is the "P" key 316 (associated with the displayed predefined input 516) for the input event sequence: key 310—key 310—key 316 producing the object 416 on the display 308 (representative of :-P).

Figure 10:
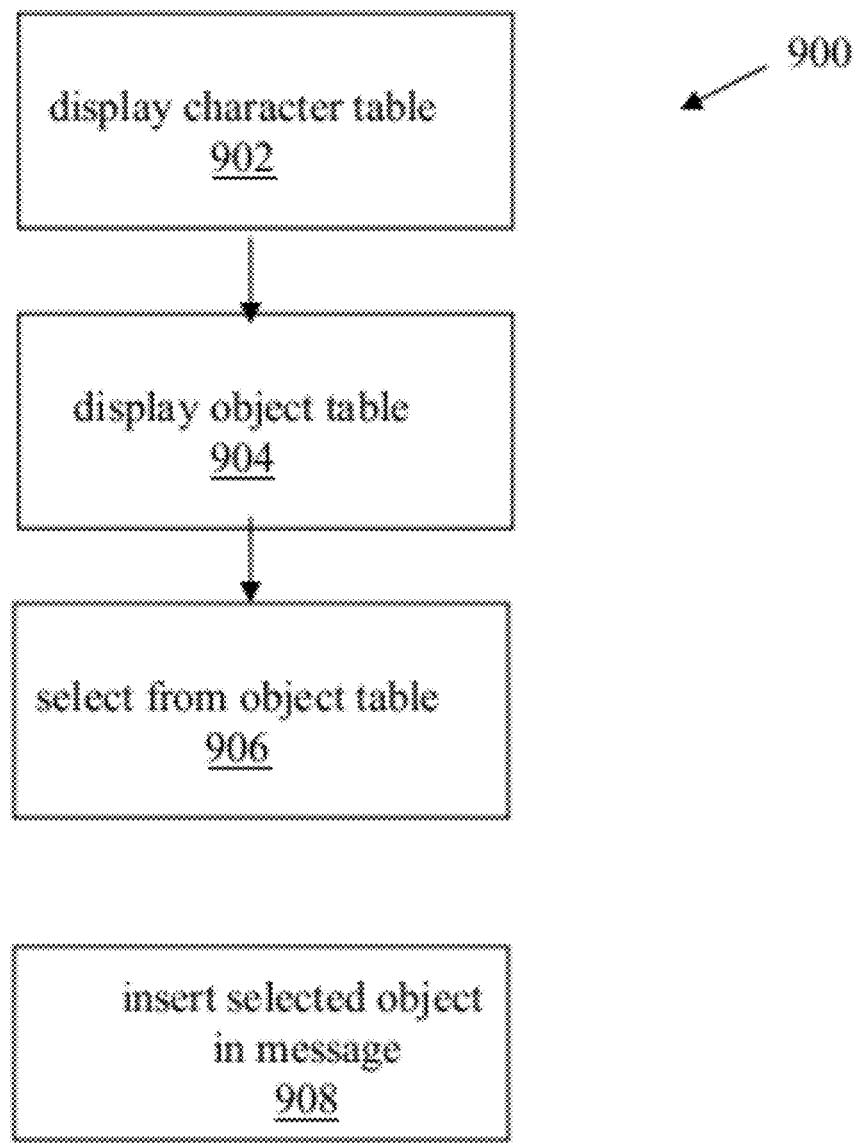
FIG. 10 is a flowchart of the operation of the object table of FIG. 4.

In operation 900 of the system 10, referring to FIGS. 3, 4 and 10, the user selects 902 a first input event (e.g. key 310) to display the symbol table 400 on the display 308 containing a plurality of individual alphanumeric characters. The user then selects 904 a second input event (e.g. key 310) where needed to display the object table 410 containing the objects 402 for selection by the user, such that the table 410 contains each object 402 (e.g. smile object 414) associated with a predefined input 403 (e.g. "Y" key 514), which is mapped to a third input event (e.g. "Y" key 306). The user then selects 906 the third input event to select the corresponding object 402 from the table 410 for insertion 908 in to the composed message 105 (see FIG. 1). It is recognized that the first input event may directly display the table 410 containing the objects 402 and corresponding predefined inputs 403 (i.e. a two user event sequence to insert the object 402 in the message 105). Further, it is recognized that further user events could be used to display the additional tables 412 before selection of the object 402.

FIG. 9 is a block diagram of a dual-mode mobile communication device 710, which is a further example of the UI 202 and infrastructure 204 of the device 100 of FIGS. 1 and 2. The dual-mode mobile communication device 710 includes a transceiver 711, a microprocessor 738, a display 722, Flash memory 724, RAM memory 726, auxiliary input/output (I/O) devices 728, a serial port 730, a keyboard 732, a speaker 734, a microphone 736, a short-range wireless communications sub-system 740, and may also include other device sub-systems 742. The transceiver 711 preferably includes transmit and receive antennas 716, 718, a receiver 712, a transmitter 714, one or more local oscillators 713, and a digital signal processor 720. Within the Flash memory 724, the dual-mode mobile communication device 710 preferably includes a plurality of software modules 724A-724N that can be executed by the microprocessor 738 (and/or the DSP 720), including a voice communication module 724A, a data communication module 724B, and a plurality of other operational modules 724N for carrying out a plurality of other functions.

The dual-mode mobile communication device 710 is preferably a two-way communication device having voice and data communication capabilities. Thus, for example, the dual-mode mobile communication device 710 may communicate over a voice network, such as any of the analog or digital cellular networks, and may also communicate over a data network. The voice and data networks are depicted in FIG. 9 by the communication tower 719. These voice and data networks may be separate communication networks using separate infrastructure, such as base stations, network controllers, etc., or they may be integrated into a single wireless network.

The communication subsystem 711 is used to communicate with the voice and data network 719, and includes the receiver 712, the transmitter 714, the one or more local oscillators 713 and may also include the DSP 720. The DSP 720 is used to send and receive signals to and from the transmitter 714 and receiver 712, and is also utilized to receive control information from the transmitter 714 and to provide control information to the receiver 712. If the voice and data communications occur at a single frequency, or closely-spaced set of frequencies, then a single local oscillator 713 may be used in conjunction with the transmitter 714 and receiver 712. Alternatively, if different frequencies are utilized for voice communications versus data communications, then a plurality of local oscillators 713 can be used to generate a plurality of frequencies corresponding to the voice and data networks 719. Although two antennas 716, 718 are depicted in FIG. 9, the dual-mode mobile communication device 710 could be used with a single antenna structure. Information, which includes both voice and data information, is communicated to and from the communication module 711 via a link between the DSP 720 and the microprocessor 738. The detailed design of the communication subsystem 711, such as frequency band, component selection, power level, etc., is dependent upon the communication network 719 in which the dual-mode mobile communication device 710 is intended to operate. For example, a dual-mode mobile communication device 710 intended to operate in a North American market may include a communication subsystem 711 designed to operate with the Mobitex™ or DataTAC™ mobile data communication networks and also designed to operated with any of a variety of voice communication networks, such as AMPS, TDMA, CDMA, PCS, etc., whereas a device 710 intended for use in Europe may be configured to operate with the General Packet Radio Service (GPRS) data communication network and the GSM voice communication network. Other types of data and voice networks, both separate and integrated, may also be utilized with the dual-mode mobile communication device 710.

Depending upon the type of network or networks 719, the access requirements for the dual-mode mobile communication device 710 may also vary. For example, in the Mobitex and DataTAC data networks, mobile devices are registered on the network using a unique identification number associated with each device. In GPRS data networks, however, network access is associated with a subscriber or user of a mobile device. A GPRS device typically requires a subscriber identity module ("SIM"), which is required in order to operate a dual-mode mobile communication device on a GPRS network. Local or non-network communication functions (if any) may be operable, without the SIM, but a dual-mode mobile communication device will be unable to carry out any functions involving communications over the data network 719, other than any legally required operations, such as 911 emergency calling.

After any required network registration or activation procedures have been completed, the dual-mode mobile communication device 710 may then send and receive communication signals, including both voice and data signals, over the network 719 (or networks). Signals received by the antenna 716 from the communication network 719 are routed to the receiver 712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 (or networks) via the antenna 718. Although a single transceiver 711 is shown in FIG. 9 for both voice and data communications, it is possible that the dual-mode mobile communication device 710 may include two distinct transceivers, a first transceiver for transmitting and receiving voice signals, and a second transceiver for transmitting and receiving data signals.

In addition to processing the communication signals, the DSP 720 also provides for receiver and transmitter control. For example, the gain levels applied to communication signals in the receiver 712 and transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the dual-mode mobile communication device 710. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the Flash memory 724 for execution by the microprocessor 738. For example, the voice communication module 724A may provide a high-level user interface operable to transmit and receive voice calls between the dual-mode mobile communication device 710 and a plurality of other voice devices via the network 719. Similarly, the data communication module 724B may provide a high-level user interface operable for sending and receiving data, such as e-mail messages, files, organizer information, short text messages, etc., between the dual-mode mobile communication device 710 and a plurality of other data devices via the network 719. In the dual-mode mobile communication device 710, a component framework 206 as described above may also be implemented as a software module or application, or incorporated into one of the software modules 724A-724N.

The microprocessor 738 also interacts with other dual-mode mobile communication device subsystems, such as the display 722, Flash memory 724, random access memory (RAM) 726, auxiliary input/output (I/O) subsystems 728, serial port 730, keyboard 732, speaker 734, microphone 736, a short-range communications subsystem 740 and any other dual-mode mobile communication device subsystems generally designated as 742.

Some of the subsystems shown in FIG. 9 perform communication-related functions, whereas other subsystems may provide resident or on-device functions. Notably, some subsystems, such as keyboard 732 and display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as Flash memory 724. In addition to the operating system, which controls all of the low-level functions of the dual-mode mobile communication device 710, the Flash memory 724 may include a plurality of high-level software application programs, or modules, such as a voice communication module 724A, a data communication module 724B, an organizer module (not shown), or any other type of software module 724N. The Flash memory 724 also may include a file system for storing data. These modules are executed by the microprocessor 738 and provide a high-level interface between a user of the dual-mode mobile communication device and the mobile device. This interface typically includes a graphical component provided through the display 722, and an input/output component provided through the auxiliary I/O 728, keyboard 732, speaker 734, and microphone 736. The operating system, specific dual-mode mobile communication device software applications or modules, or parts thereof, may be temporarily loaded into a volatile store, such as RAM 726 for faster operation. Moreover, received communication signals may also be temporarily stored to RAM 726, before permanently writing them to a file system located in the persistent store 724.

An exemplary application module 724N that may be loaded onto the dual-mode mobile communication device 710 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The Flash memory 724 preferably provides a file system to facilitate storage of PIM data items on the dual-mode mobile communication device 710. The PIM application preferably includes the ability to send and receive data items, either by itself, or in conjunction with the voice and data communication modules 724A, 724B, via the wireless network 719. The PIM data items are preferably seamlessly integrated, synchronized and updated, via the wireless network 719, with a corresponding set of data items stored or associated with a host computer system, thereby creating a mirrored system for data items associated with a particular user.

The dual-mode mobile communication device 710 may also be manually synchronized with a host system by placing the dual-mode mobile communication device 710 in an interface cradle, which couples the serial port 730 of the dual-mode mobile communication device 710 to the serial port of the host system. The serial port 730 may also be used to enable a user to set preferences through an external device or software application, or to download other application modules 724N for installation. This wired download path may be used to load an encryption key onto the dual-mode mobile communication device 710, which is a more secure method than exchanging encryption information via the wireless network 719.

Additional application modules 724N may be loaded onto the dual-mode mobile communication device 710 through the network 719, through an auxiliary I/O subsystem 728, through the serial port 730, through the short-range communications subsystem 740, or through any other suitable subsystem 742, and installed by a user in the Flash memory 724 or RAM 726. Such flexibility in application installation increases the functionality of the dual-mode mobile communication device 710 and may provide enhanced on-device functions, communication-related functions, or both. For example, secure communication applications may enable electronic commerce functions and other such financial transactions to be performed using the dual-mode mobile communication device 710.

When the dual-mode device 710 is operating in a data communication mode, a received signal, such as a text message or a web page download, will be processed by the transceiver 711 and provided to the microprocessor 738, which will preferably further process the received signal for output to the display 722, or, alternatively, to an auxiliary I/O device 728. A user of the dual-mode mobile communication device 710 may also compose data items, such as email IM and SMS messages, using the keyboard 732, which is preferably a complete alphanumeric keyboard laid out in the QWERTY style, although other styles of complete alphanumeric keyboards such as the known DVORAK style may also be used. User input to the dual-mode mobile communication device 710 is further enhanced with a plurality of auxiliary I/O devices 728, which may include a thumbwheel input device, a touchpad, a variety of switches, a rocker input switch, etc. The composed data items input by the user may then be transmitted over the communication network 719 via the transceiver 711.

When the dual-mode mobile communication device 710 is operating in a voice communication mode, the overall operation of the dual-mode mobile communication device 710 is substantially similar to the data mode, except that received signals are preferably be output to the speaker 734 and voice signals for transmission are generated by a microphone 736. Alternative voice or audio I/O subsystems, such as a voice message recording subsystem, may also be implemented on the dual-mode mobile communication device 710. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 is also included in the dual-mode mobile communication device 710. For example, the short-range communications subsystem 740 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and 802.11 refer to sets of specifications, available from the Institute of Electrical and Electronics Engineers (IEEE), relating to wireless personal area networks and wireless LANs, respectively.

The above description relates to one or more exemplary systems and methods. Many variations will be apparent to those knowledgeable in the field, and such variations are within the spirit and scope of the invention as outlined in the claims appended hereto.

What is claimed is:
1. A wireless device comprising:
a first input event component executing a first input event and a second input event;
a user interface displaying a symbol table in response to the first input event, the symbol table including a plurality of individual symbol selections;
the user interface displaying an object table in response to the second input event, the object table comprising a plurality of graphic objects and a plurality of predefined inputs, each of the plurality of predefined inputs associated with each of the plurality of graphic objects; and a second input event component executing a third input event, the third input event mapped to one of the plurality of predefined inputs;
wherein the third input event selects a graphic object associated with the predefined input from the plurality of graphic objects and inserts the selected graphic object in a text based message.

2. The wireless device of claim 1, wherein the plurality of graphic objects is selected from the group consisting of: emoticons; abbreviated text strings; icons; predefined groups of alphanumeric characters and a combination thereof.

3. The wireless device of claim 2, wherein the alphanumeric characters are selected from the group consisting of ASCII characters, Unicode characters, and a combination thereof.

4. The wireless device of claim 1 wherein the first input event component is an input key of a keyboard of the user interface.

5. The wireless device of claim 1, wherein the third input event is executed through a voice command of the user interface.

6. The wireless device of claim 1, wherein the first and second input event components are different input keys of a keyboard.

7. The wireless device of claim 1, wherein the symbol table is a first symbol table of plurality of symbol tables and wherein the first input event comprises a series of events causing each of the plurality of symbol tables to be displayed.

8. A method for selecting graphic objects to insert in a text based message when composed on a wireless device, the method comprising:
executing a first input event using a first input component to enter a first mode, wherein in the first mode a symbol table is displayed on a user interface of the wireless device, the symbol table including a plurality of individual symbol selections;
executing a second input event using the first input component to enter a second mode, wherein in the second mode an object table is displayed on the user interface of the wireless device, the object table comprising a plurality of graphic objects and a plurality of predefined inputs, each of the plurality of predefined inputs associated with one of the plurality of the graphic objects;
executing a third input event using a second input event component, the third input event mapped to one of the plurality of predefined inputs, the third input event selecting a graphic object associated with the predefined input from the plurality of graphic objects and inserting the selected graphic object in the text based message.

9. The method of claim 8, wherein the plurality of graphic objects is selected from the group consisting of: emoticons; abbreviated text strings; icons; predefined groups of alphanumeric characters, and a combination thereof.

10. The method of claim 9, wherein the alphanumeric characters are selected from the group consisting of ASCII characters and Unicode characters, and a combination thereof.

11. The method of claim 9, wherein the first input event is executed through an input key of a keyboard of the user interface.

12. The method of claim 9, wherein the third input event is executed through a voice command of the user interface.

13. The method of claim 12, wherein the voice command is displayed in the object table.

14. The method of claim 8, wherein the message is configured for sending to a remote message server.

15. The method of claim 14, further comprising translating the selected graphic object in the message to an equivalent string of the individual alphanumeric characters represented by the selected graphic object.

16. The method of claim 14, further comprising transmitting the message to a server selected from the group consisting of: an email server; an instant messaging server; and a short message service server.

* * * * *